US010405650B2

(12) United States Patent
Turner et al.

(10) Patent No.: US 10,405,650 B2
(45) Date of Patent: Sep. 10, 2019

(54) HEATING AND COOLING SYSTEM FOR A FOOD STORAGE CABINET

(71) Applicant: Bi-Polar Holding Company LLC, Salt Lake City, UT (US)

(72) Inventors: Jeffrey Turner, Salt Lake City, UT (US); Tyler Lyon, Bluffdale, UT (US); Daniel Winegar, Bluffdale, UT (US)

(73) Assignee: Bi-Polar Holdings Company, LLC, Salt Lake City, UT (US)

( * ) Notice: Subject to any disclaimer, the term of this patent is extended or adjusted under 35 U.S.C. 154(b) by 330 days.

(21) Appl. No.: 14/597,438

(22) Filed: Jan. 15, 2015

(65) Prior Publication Data
US 2015/0201749 A1  Jul. 23, 2015

Related U.S. Application Data

(60) Provisional application No. 61/928,173, filed on Jan. 16, 2014.

(51) Int. Cl.
*F25B 21/04* (2006.01)
*A47J 36/24* (2006.01)
(Continued)

(52) U.S. Cl.
CPC ........... *A47B 31/02* (2013.01); *A47J 36/2483* (2013.01); *A47J 39/006* (2013.01); *F25B 21/04* (2013.01)

(58) Field of Classification Search
CPC . A47J 36/2483; A47J 39/006; B60H 1/00478; H01L 35/30; H01L 35/28; A47B 31/02; F25B 21/04; F25B 2321/0252
See application file for complete search history.

(56) References Cited

U.S. PATENT DOCUMENTS 3,138,934 A   6/1964  Roane
3,214,922 A   11/1965 Koblischek
(Continued)

FOREIGN PATENT DOCUMENTS

DE   10334354 A1 *  7/2004  ........... H01L 23/473
DE   10334354 A1 *  7/2004  ........... H01L 23/473
(Continued)

OTHER PUBLICATIONS

"Machine Translation of DE 10334354, Bresch, Jul. 2004".*

*Primary Examiner* — Frantz F Jules
*Assistant Examiner* — Martha Tadesse
(74) *Attorney, Agent, or Firm* — Bretton L. Crockett; TechLaw Ventures, PLLC

(57) ABSTRACT

Systems for heating or cooling a food service container to an appropriate temperature for service or transport, and cabinets including such systems. A first manifold allows a seal to be made against a first surface of one or more Peltier chips and defines a flow path for a heat transfer fluid which directly contacts the first surfaces of the Peltier chips. The fluid circulates through tubing from the first manifold to a first radiator. A second opposite manifold defines a flow path for a heat transfer fluid which directly contacts the second surfaces of the Peltier chips. The fluid then circulates through tubing from the second manifold to a second radiator. The first radiator may be disposed inside, and the second radiator outside, the cabinet. Application of current in a first direction to the Peltier chips can heat the cabinet and reversal of the current may cool the cabinet.

20 Claims, 13 Drawing Sheets

(51) Int. Cl.
    *A47B 31/02*        (2006.01)
    *A47J 39/00*        (2006.01)

(56) References Cited

U.S. PATENT DOCUMENTS

| | | | |
|---|---|---|---|
| 3,314,242 A | 4/1967 | Lefferts | |
| 3,324,667 A | 6/1967 | Muller | |
| 3,481,393 A * | 12/1969 | Chu | F28F 3/12 |
| | | | 165/104.31 |
| 5,086,693 A | 2/1992 | Tippman et al. | |
| 5,154,661 A | 10/1992 | Higgins | |
| 5,201,364 A * | 4/1993 | Tippmann | A47J 39/006 |
| | | | 126/19 R |
| 5,282,367 A | 2/1994 | Moore et al. | |
| 5,363,672 A | 11/1994 | Moore et al. | |
| 5,404,935 A | 4/1995 | Liebermann | |
| 5,461,878 A | 10/1995 | Moore et al. | |
| 5,544,487 A | 8/1996 | Attey et al. | |
| 5,588,300 A | 12/1996 | Larsson et al. | |
| 5,628,769 A | 5/1997 | Saringer | |
| 5,653,111 A | 8/1997 | Attey et al. | |
| 5,711,155 A | 1/1998 | DeVilbiss et al. | |
| 5,718,124 A | 2/1998 | Senecal | |
| 5,782,094 A | 7/1998 | Freeman | |
| 5,871,526 A | 2/1999 | Gibbs et al. | |
| 5,895,418 A | 4/1999 | Saringer | |
| 5,921,096 A | 7/1999 | Warren | |
| 5,931,001 A * | 8/1999 | Watanabe | F24F 5/0042 |
| | | | 165/54 |
| 5,941,077 A | 8/1999 | Safyan | |
| 5,970,719 A | 10/1999 | Merritt | |
| 6,293,107 B1 * | 9/2001 | Kitagawa | F25B 21/02 |
| | | | 62/3.2 |
| 6,344,630 B1 * | 2/2002 | Jarvis | A47J 39/006 |
| | | | 219/386 |
| 6,409,186 B2 | 6/2002 | Bennington | |
| 6,467,294 B1 | 10/2002 | Walker et al. | |
| 6,502,405 B1 | 1/2003 | Van Winkle | |
| 6,735,958 B2 | 9/2004 | Baumann | |
| 7,069,732 B2 | 7/2006 | Walker et al. | |
| 7,394,655 B1 * | 7/2008 | O'Keeffe | H05K 7/20363 |
| | | | 361/700 |
| 7,665,311 B2 | 2/2010 | Steffensen et al. | |
| 7,748,228 B2 | 7/2010 | Walker et al. | |
| 8,850,829 B2 | 10/2014 | Brija | |
| 8,952,556 B2 | 2/2015 | Warren | |
| 2001/0004863 A1 | 6/2001 | Simeray et al. | |
| 2002/0139123 A1 | 10/2002 | Belle | |
| 2004/0025516 A1 * | 2/2004 | Van Winkle | B60H 1/00478 |
| | | | 62/3.3 |
| 2004/0068991 A1 * | 4/2004 | Banney | F28F 1/045 |
| | | | 62/3.7 |
| 2006/0277924 A1 | 12/2006 | Platkin | |
| 2007/0159797 A1 * | 7/2007 | Teneketges | H01L 23/473 |
| | | | 361/699 |
| 2008/0156476 A1 * | 7/2008 | Smisson | A61M 5/36 |
| | | | 165/185 |
| 2008/0283042 A1 | 11/2008 | Tippmann, Jr. et al. | |
| 2011/0146301 A1 | 6/2011 | Chapman et al. | |
| 2013/0174577 A1 * | 7/2013 | Brija | F25B 21/04 |
| | | | 62/3.2 |
| 2014/0272063 A1 * | 9/2014 | Tippman | A47J 39/006 |
| | | | 426/520 |
| 2014/0366559 A1 | 12/2014 | Brija et al. | |

FOREIGN PATENT DOCUMENTS

| | | |
|---|---|---|
| DE | 102011010395 A1 | 8/2012 |
| DE | 102012003237 B3 | 4/2013 |

\* cited by examiner

HEATING AND COOLING SYSTEM FOR A FOOD STORAGE CABINET

CROSS REFERENCE TO RELATED APPLICATIONS

This application claims priority to and incorporates by reference all of the subject matter included in Provisional Patent Application Ser. No. 61/928,173, which was filed Jan. 16, 2014.

TECHNICAL FIELD

The present invention relates generally to the service of food at a desired temperature and, more particularly, to systems and apparatus for heating and cooling food for transport and serving.

BACKGROUND

Perishable foods for home, market, catering and restaurant buffets are conventionally chilled by ice or commercially manufactured containers of freezable material, or by refrigeration systems. When the ice melts and the freezable material warms, these cooling media lose their ability to keep foods safe and may render them unsuitable or hazardous for consumption. Typical refrigeration systems are bulky and costly, requiring condensers, coils and harmful chemicals and, further, must be serviced and maintained. Additionally, they are not easily adapted for portability.

Other foods need to be heated or kept warm for home, market, catering and restaurant buffet service. Conventional sources of heat include flame and electricity, e.g. by use of alcohol-based combustible gels, such as those offered under the tradename STERNO, or by electric hot plates. Flame sources often produce local hot spots and uneven heating and may produce fumes, odors, or other combustion products. The indoor pollution and health risks to food service workers and patrons from these combustion products are beginning to be viewed with concern by those in the industry.

U.S. Pat. No. 6,344,630 to Jarvis et al., which is incorporated by reference herein in its entirety, discloses a heated food cart which uses a thermoelectric heater "with an air circulatory system over the heating members of the thermoelectric solid state." However, such cabinets may take a long time to reach a desired temperature and may be relatively inefficient.

Consequently, a system or method that allows for a transport cabinet to both heat and cool food which is efficient, and capable of reaching a desired temperature in a short amount of time with a simple set of controls and using only a single-type of temperature adjusting element would be an improvement in the art. The ability to use such a system with pre-existing food service trays, carts and other applications would be an additional improvement.

SUMMARY

The present invention provides systems and apparatus for heating or cooling food to an appropriate temperature for service in a food service container, such as a food transport cart. A first manifold may have a plurality of openings, each allowing a seal to be made against a first surface of a Peltier chip and defines a flow path for a heat transfer fluid which directly contacts the first surfaces of the Peltier chip(s). The fluid then circulates through tubing from the manifold to a separate radiator. A second opposite manifold also has a plurality of openings, each allowing a seal to be made against a second surface of the Peltier chip(s) to define a flow path for a heat transfer fluid which directly contacts the second surfaces of the plurality of Peltier chip(s). The fluid then circulates through tubing from the manifold to a separate second radiator. The two manifolds may be joined to form a block enclosing the chips. One or more fans may be placed to encourage airflow through the radiators and coolant reservoirs and pumps may be included, as needed. The first radiator may be disposed inside a food transport/food service cabinet and the second radiator outside the cabinet, for example on the rear of the cabinet. Application of current in a first direction to the Peltier chips can heat the interior of the cabinet and reversal of the current may be used to cool the cabinet.

DESCRIPTION OF THE DRAWINGS

It will be appreciated by those of ordinary skill in the art that the various drawings are for illustrative purposes only. The nature of the present disclosure, as well as other varying embodiments, may be more clearly understood by reference to the following detailed description, and to the drawings.

DETAILED DESCRIPTION

Figure 1:
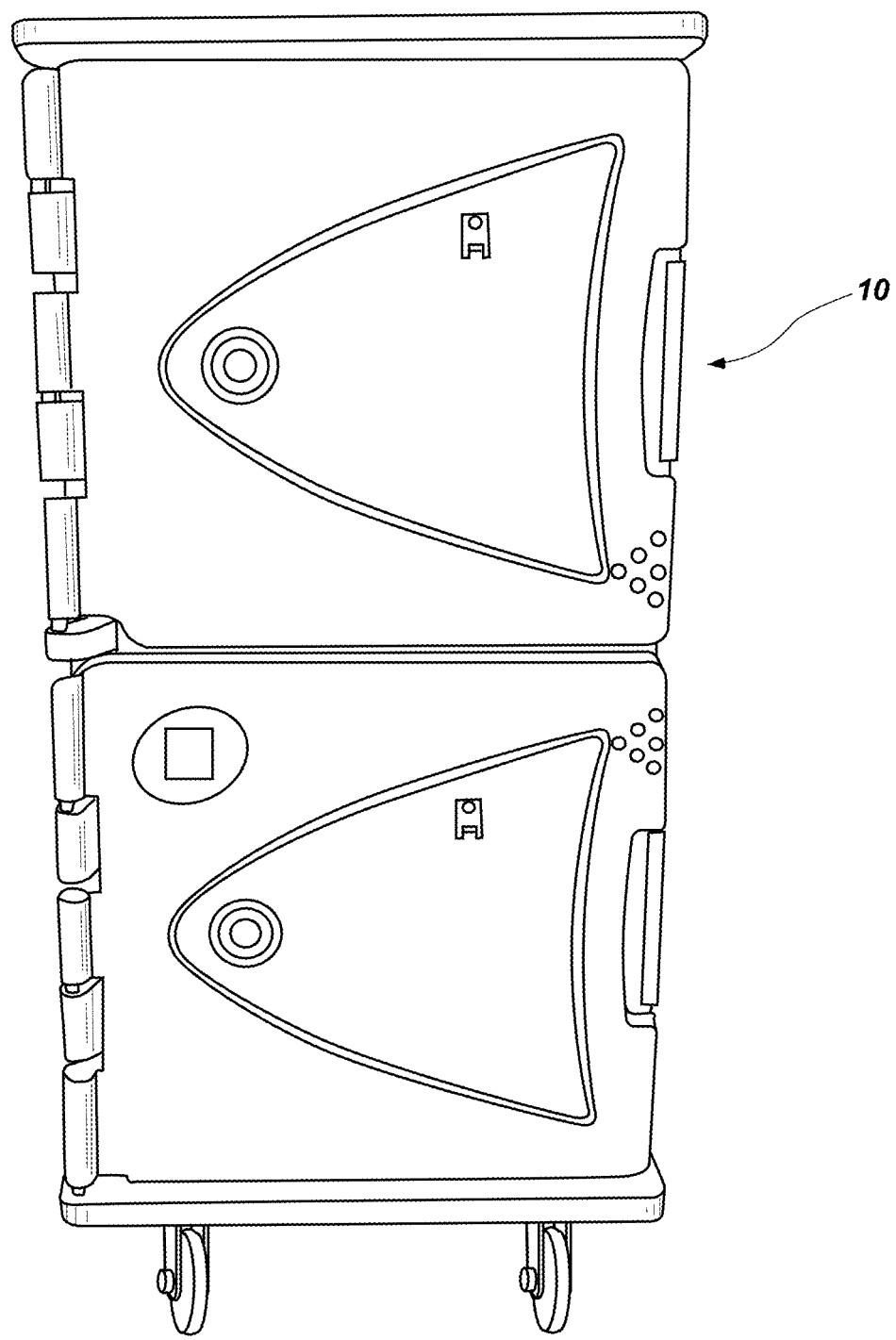
FIGS. 1 and 2 are front views of a food transport cabinet including systems in accordance with the present disclosure.
Figure 2:
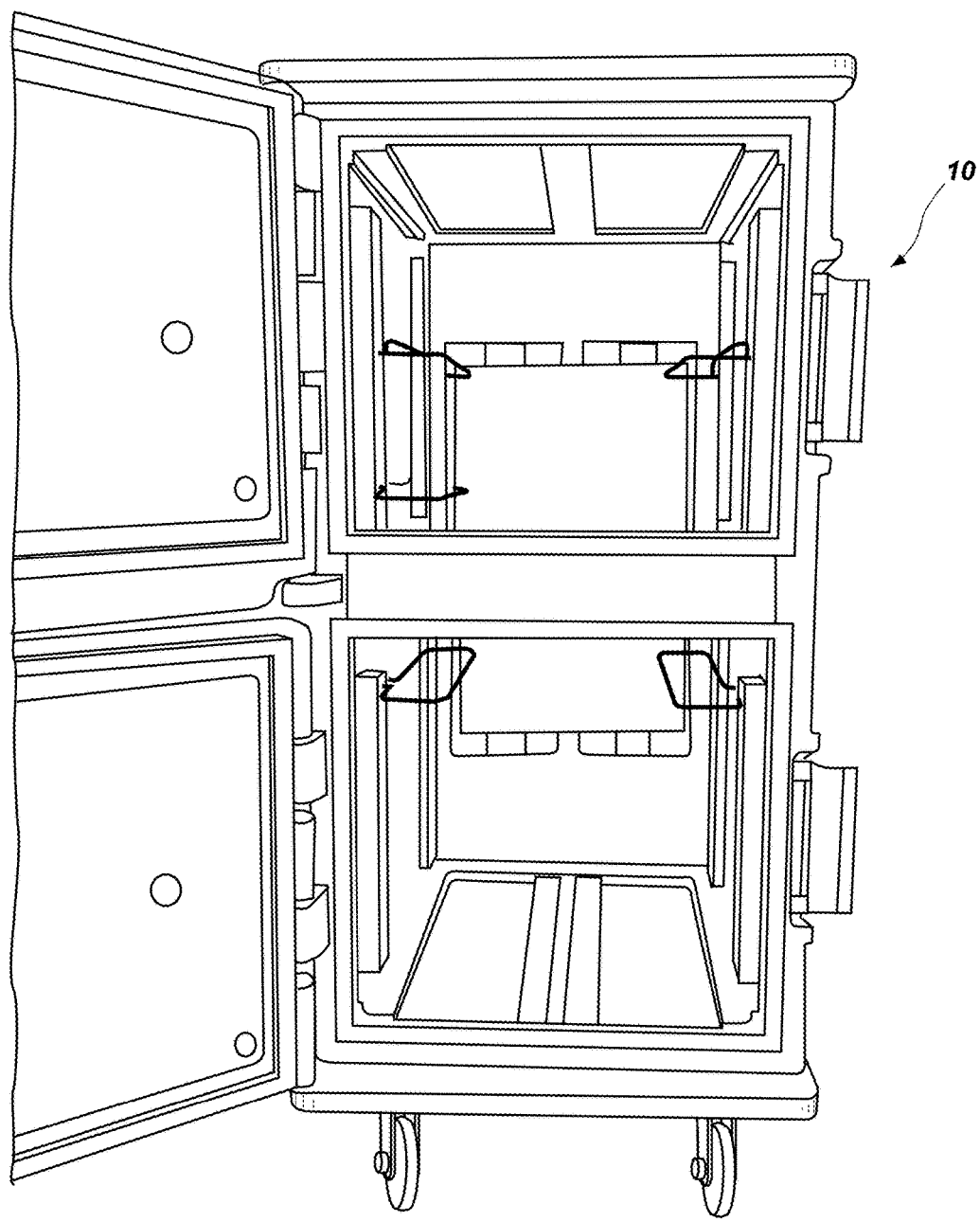
Figure 3:
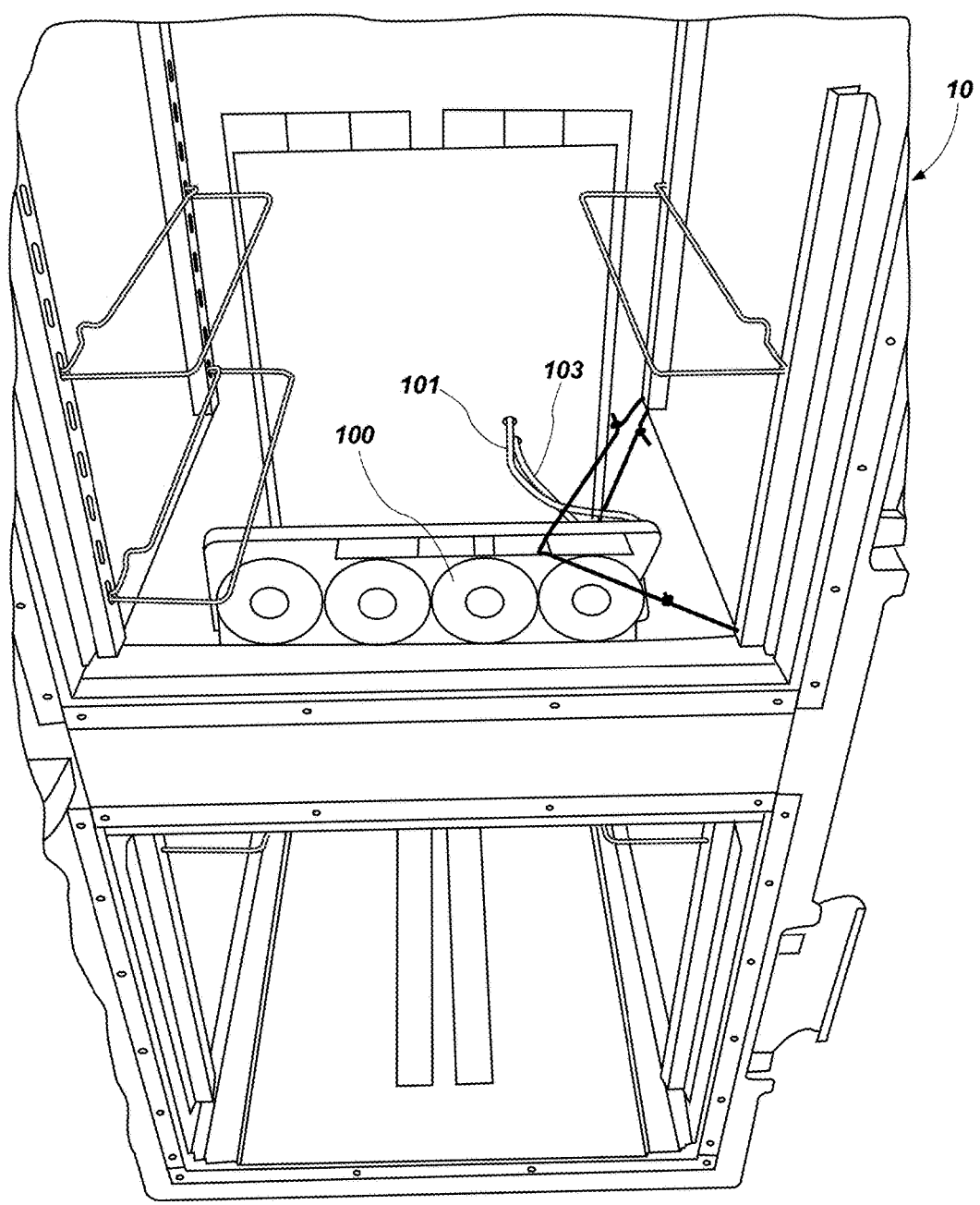
FIG. 3 is a close view of the interior of the cabinet of FIGS. 1 and 2.

The present disclosure relates to systems, methods and apparatus for heating or cooling food to an appropriate temperature for service in a standard food service container, such as a food cart. It will be appreciated by those skilled in the art that the embodiments herein described, while illustrating certain embodiments, are not intended to limit the disclosure. Those skilled in the art will also understand that various combinations or modifications of the embodiments presented herein can be made without departing from the scope of this disclosure and that all such alternate embodiments are within the scope of this description. Similarly, while the drawings depict illustrative embodiments of the devices and components illustrate the principles upon which those devices and components are based, they are only illustrative, and any modifications of the features presented here are to be considered within the scope of this disclosure.

FIGS. 1, 2, 3, 4A and 4B depict a food transport cabinet 10 which is one illustrative embodiment of a cabinet 10 in accordance with the present disclosure, and includes a temperature control system in accordance with the principles of the present disclosure.

The food transport cabinet 10 may be an insulated food service container which can be moved on casters. This may be similar to the type of cart used to transport prepared food to a location for catering, or for meal delivery in a hospital setting. Cart 10 may have a series of racks or holders interiorly thereof to hold trays of food or dishes. The cart 10 may be made of a blow molded or rotationally molded plastic material and have double walls, which are filled with insulating foam for maintaining the heat within the cabinet. In other embodiments, the cabinet 10 may be constructed of metal, and may have an intermediate insulative layer between the walls thereof. In order to provide access, a knuckle hinged door with a latching handle may be provided to close the open front of the cabinet.

A first radiator 100 may be disposed in the interior of the cabinet 10. Tubing 101 and 103 connects to the radiator through the back of the cabinet 10 interior into the rear shroud 120. One or more fans 102 may be associated with the radiator 100 to create a desired airflow within the cabinet 10 upon activation and wiring for the fans 102 may run to the cabinet 10 exterior as well. As depicted, the radiator 100 and fans 102 may be placed generally near a midpoint of the interior to facilitate airflow and minimize encroaching on useable storage space. It will be appreciated that in some embodiment, the first radiator 100 may comprise one or more separate radiators positioned at different locations around the interior of the cabinet 10.

On the rear surface 150 of the cabinet 10 exterior 150 a shroud which may be formed as a rectangular box may be disposed. A number of vents 154 may be formed in the shroud 152 to facilitate airflow and may correspond with a plurality of fans 202. As best depicted in FIG. 4B, the shroud may have side openings or other vents as well.

Figure 5:
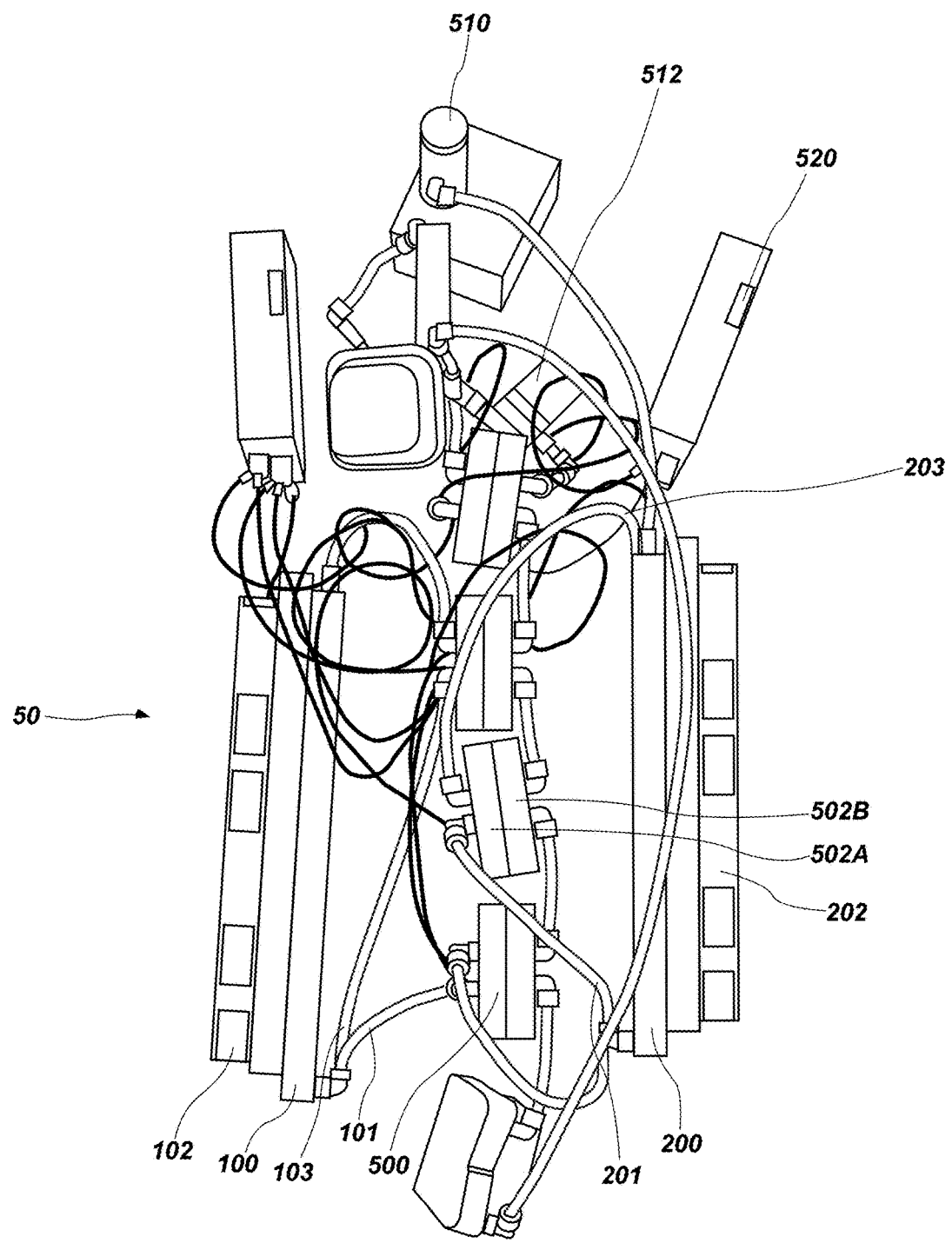
FIG. 5 is a top view of some of the components of the heating and cooling system of the cabinet of FIGS. 1-4B shown in isolation for testing.

FIG. 5 depicts a number of components of a system 50 for heating and cooling the cabinet 10 which are assembled in isolation from the cabinet 10. In some embodiments, with the exception of the first radiator 100 and fans 102, these components will be retained in the shroud 152.

Figure 7:
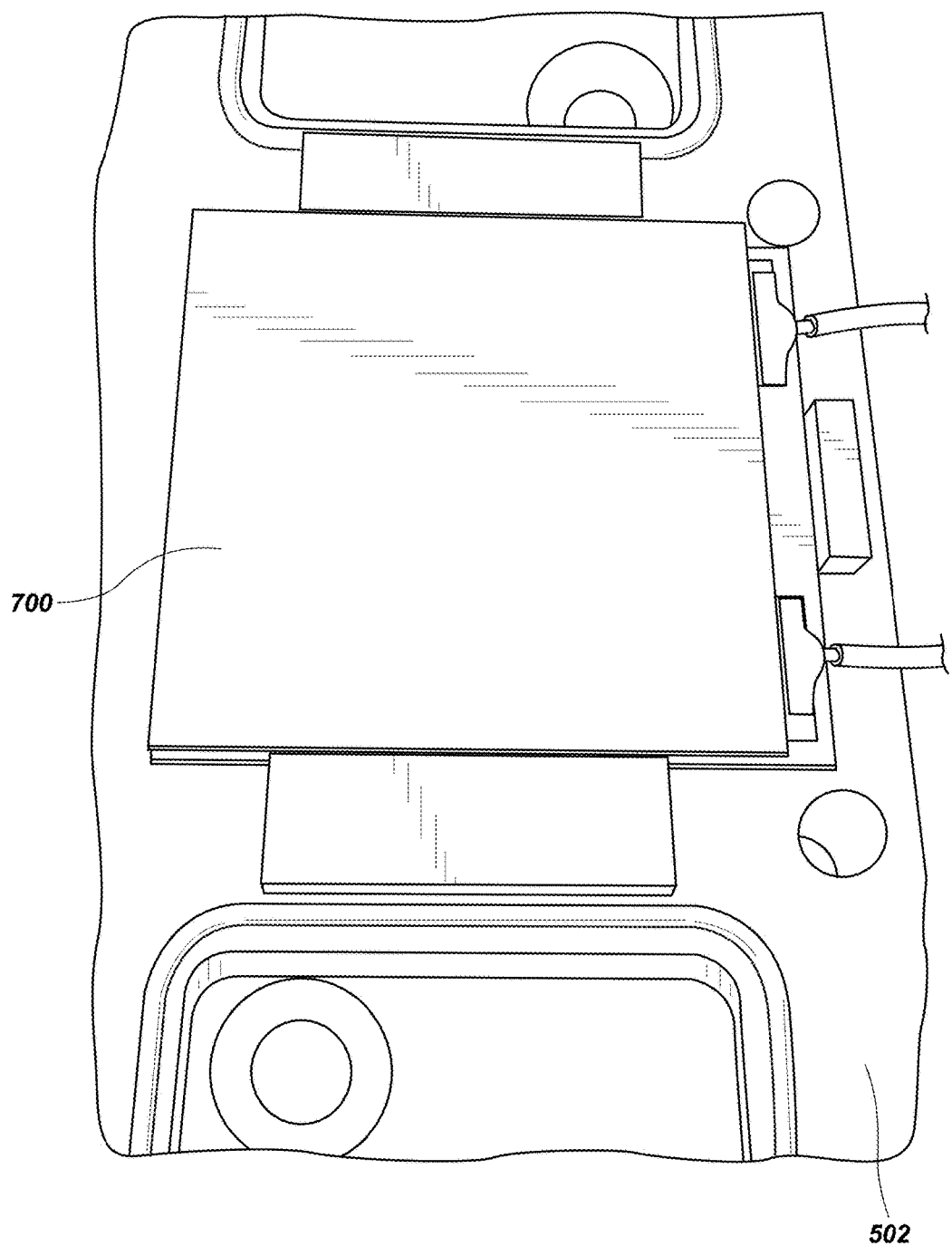
FIG. 7 is a top perspective view of a Peltier chip in position on the manifold of FIG. 6B.

One or more manifold blocks 500 contain a one or more Peltier chips. An individual Peltier chip 700 is depicted in FIG. 7. Each Peltier chip 700 is a thermoelectric converter element whose effect is based on the Peltier principle in that they are capable of both cooling and heating by virtue of the fact that between their electrodes a temperature differential is created whose directionality is a function of the direction of the current. It will be appreciated that a suitable number of chips 700 may be used, which are sufficient to heat or cool the cabinet 10 interior to a suitable temperature. In the depicted embodiment, multiple blocks 500 are depicted, each containing four chips 700, but it will be appreciated, that a single block holding a differing number of chips may be used.

A typical Peltier chip 700 currently in use may be operated at from about 11 to about 15 volts to achieve optimal performance. It will be appreciated that different voltages may be used as the particular chips 700 may vary.

Figure 6A:
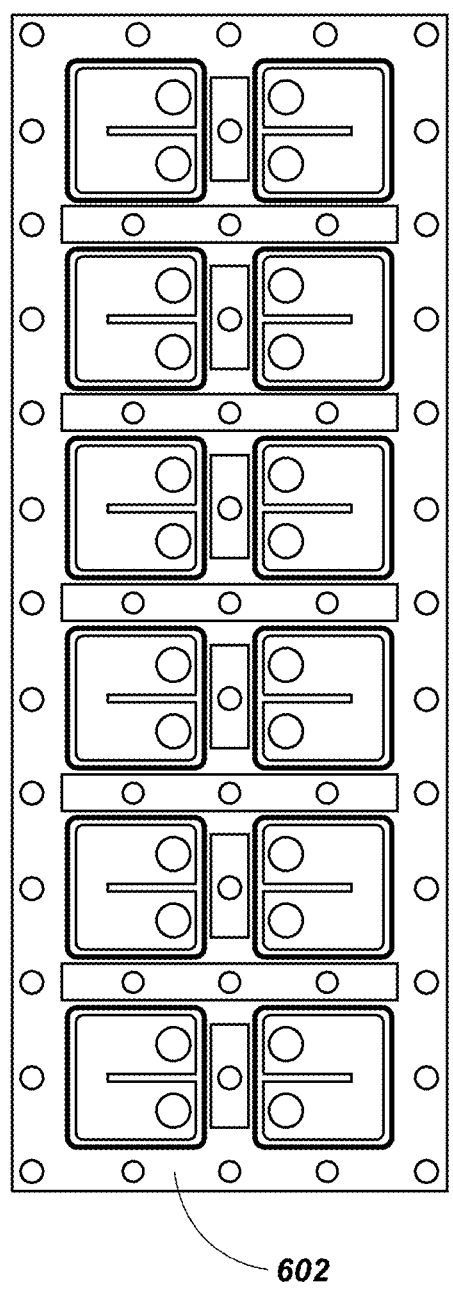
FIGS. 6A and 6B are plan and top perspective views of two manifolds for use in the system of FIGS. 1-5.
Figure 6B:
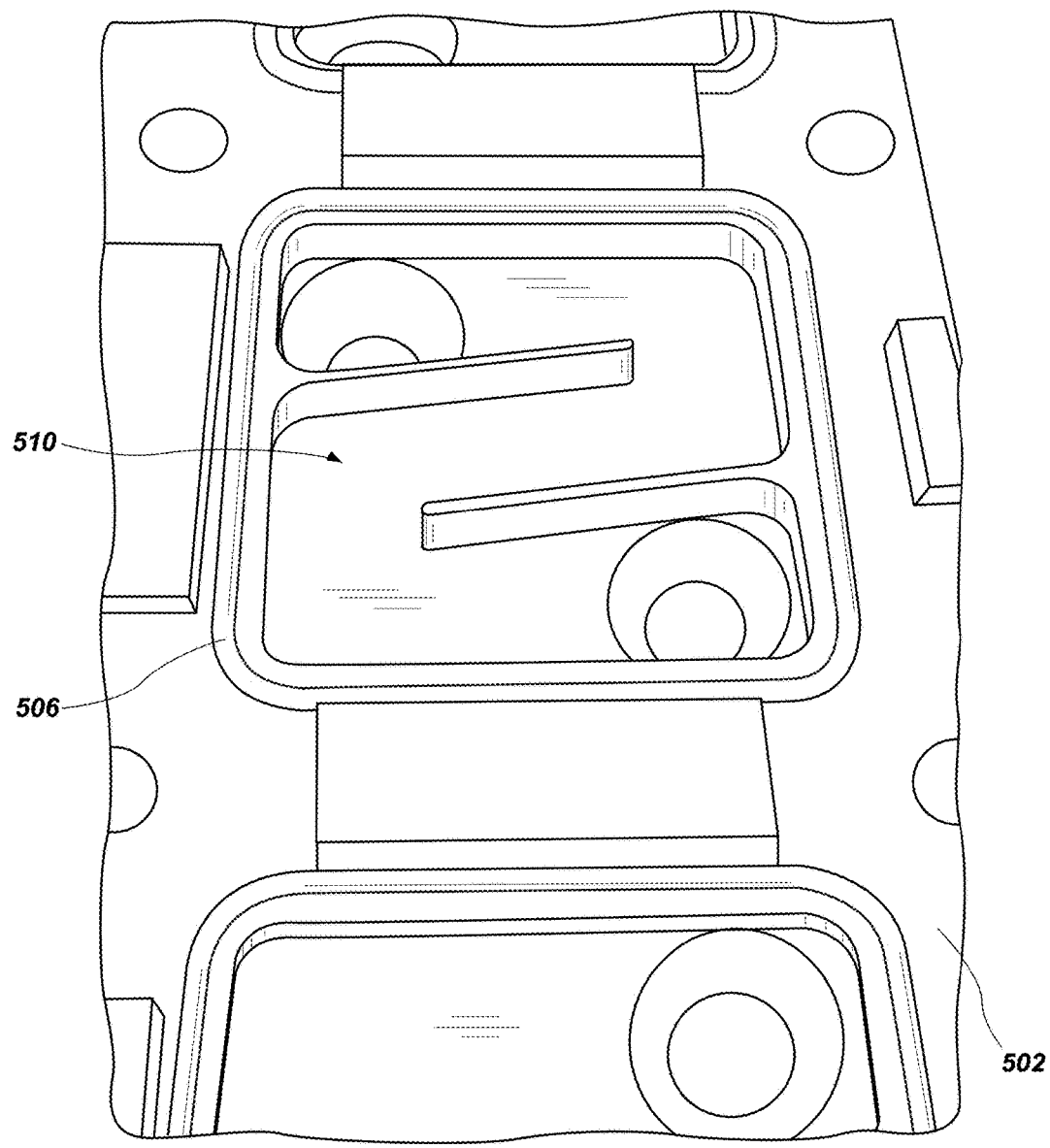
Figure 8:
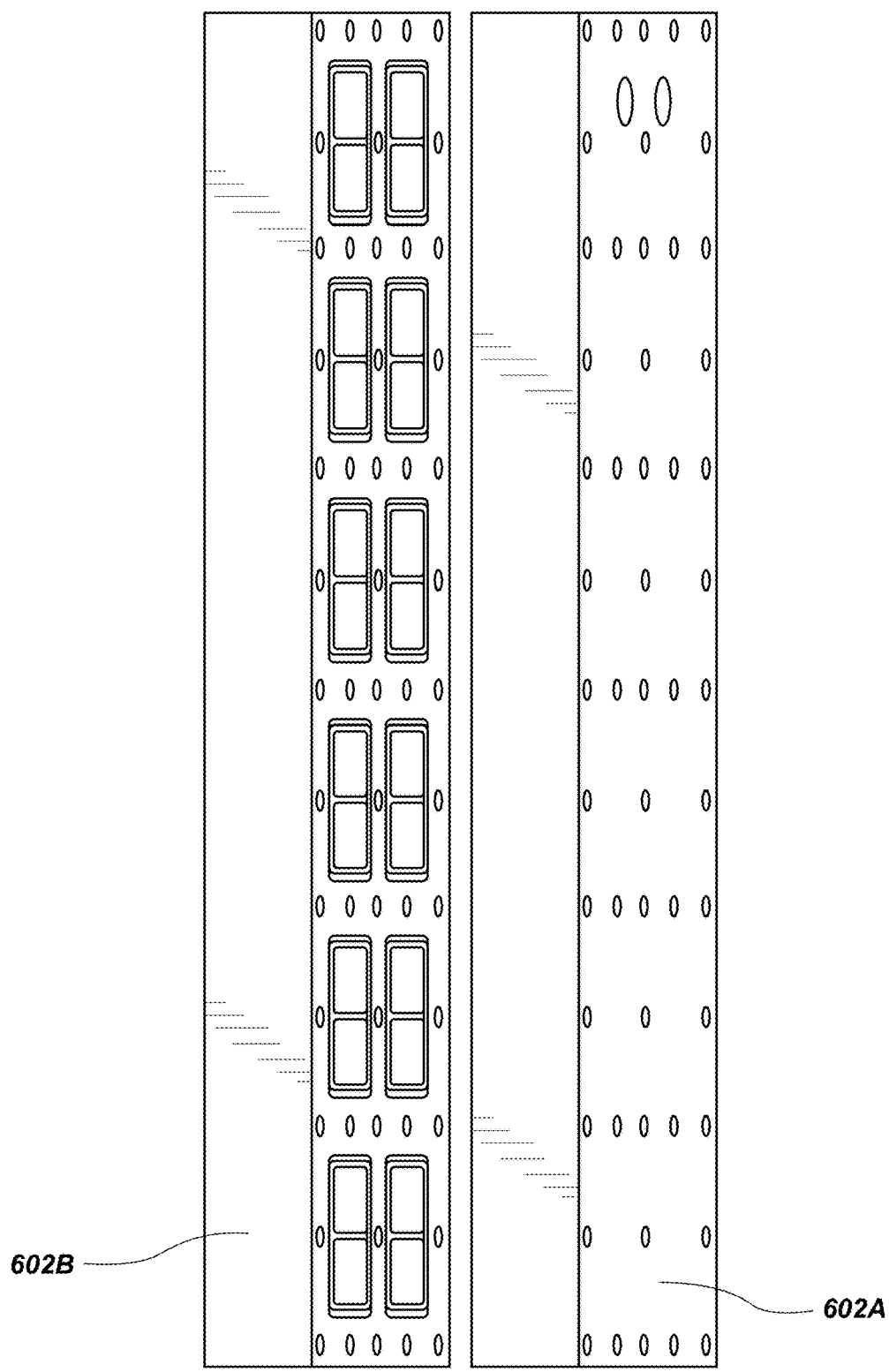
FIG. 8 is a perspective view of two manifolds of FIG. 6A, showing the relationship used in forming the manifold block of FIGS. 4B and 5.

Each manifold block 500 may be formed from two manifolds 502, which are joined face to face with the chips 700 sandwiched therebetween. FIG. 8 depicts the face to face relationship of a second embodiment of manifolds 602A and 602B. The face 503 of each manifold 502 is best depicted in FIGS. 6 and 7 and contains a plurality of recesses for receiving a chip 700, each recess contains a flow path 510, which may be formed as a channel having a Z, S or other shape (such as the C shape of the manifolds 502 in FIG. 8) to direct the flow a heat transfer liquid from one opening to another. A shelf or notch may hold a seal, such as an O-ring 506, and a may provide a seat for a chip 700, as best shown in FIG. 7.

When the chip 700 is in place and manifolds 502A and 502B are connected to form a manifold block 500, the flow paths 510 direct the flow of a heat transfer liquid directly against the surface of the chip 700. Each manifold 502 also contains channels directing the fluid from the flow paths to tubing connected to the manifold. From the first manifold 502A, tubing 101 flows to the radiator 100 and the return tube 103 returns the fluid which has transferred its thermal energy using the radiator 100 back to the manifold block, which may be via a reservoir and a pump.

Similarly, from the second manifold 502B, tubing 201 flows to the second radiator 200 and the return tube 203 returns the fluid which has transferred its thermal energy using the radiator 200 back to the manifold block, which may be via a reservoir 510 and a pump 512. A transformer and/or power block 520 may be used to supply power to the chips 700 and the pump(s).

Each pump may be any pump with sufficient power to circulate heat transfer fluid through the tubing at a rate sufficient to allow the system to function at an acceptable rate of heating or cooling. Typically, centrifugal-type pumps may be used, although it may be possible to utilize a larger in-line pump.

Each radiator is typically finned to provide a larger surface area for convection heat exchange to the surrounding air. Since the apparatus 10 is used for heating or cooling food, a non-toxic heat transfer fluid may be used. One such fluid is water, although other acceptable commercially available non-toxic coolants, such as PAHNOL, offered by Houton Chemical, may be used.

Figure 4A:
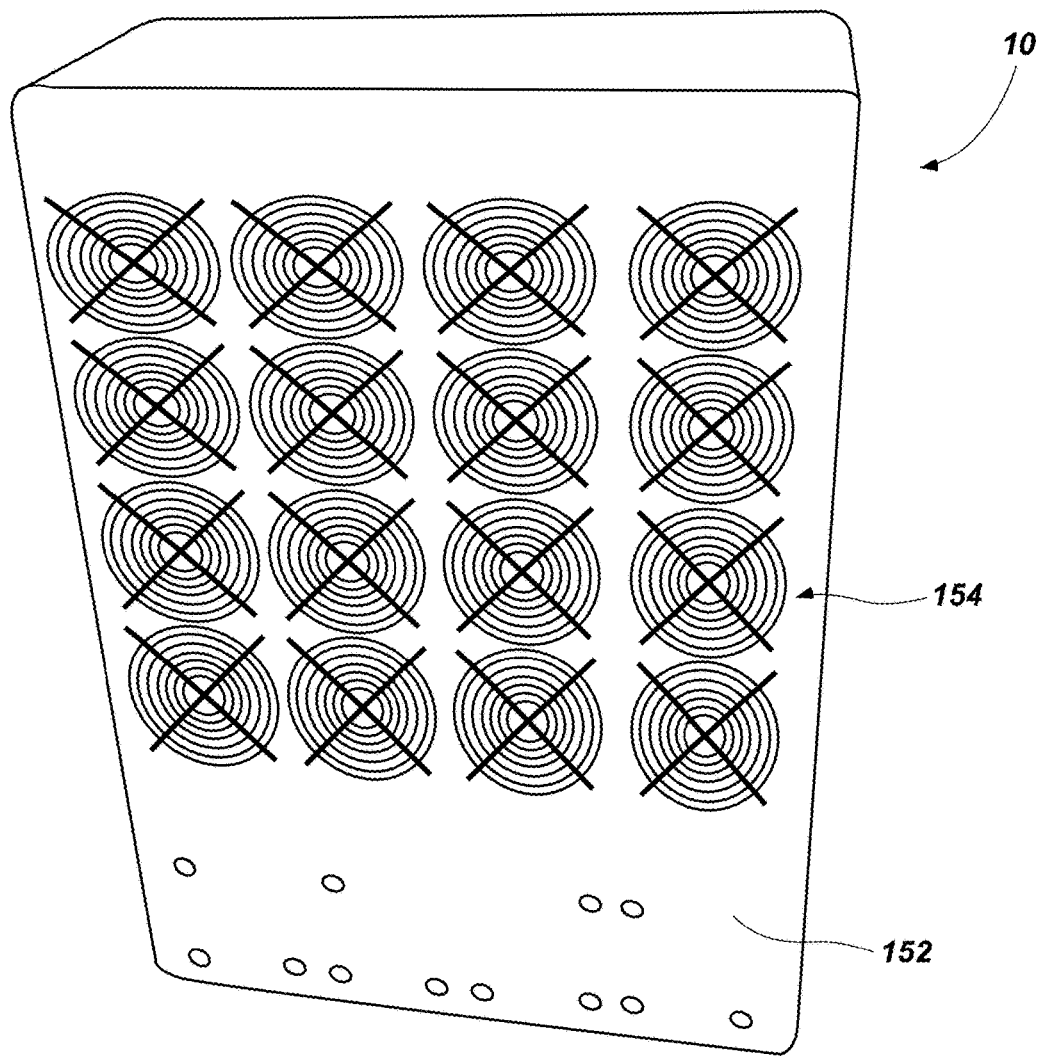
FIG. 4A is a rear view of the cabinet of FIGS. 1-3.
Figure 4B:
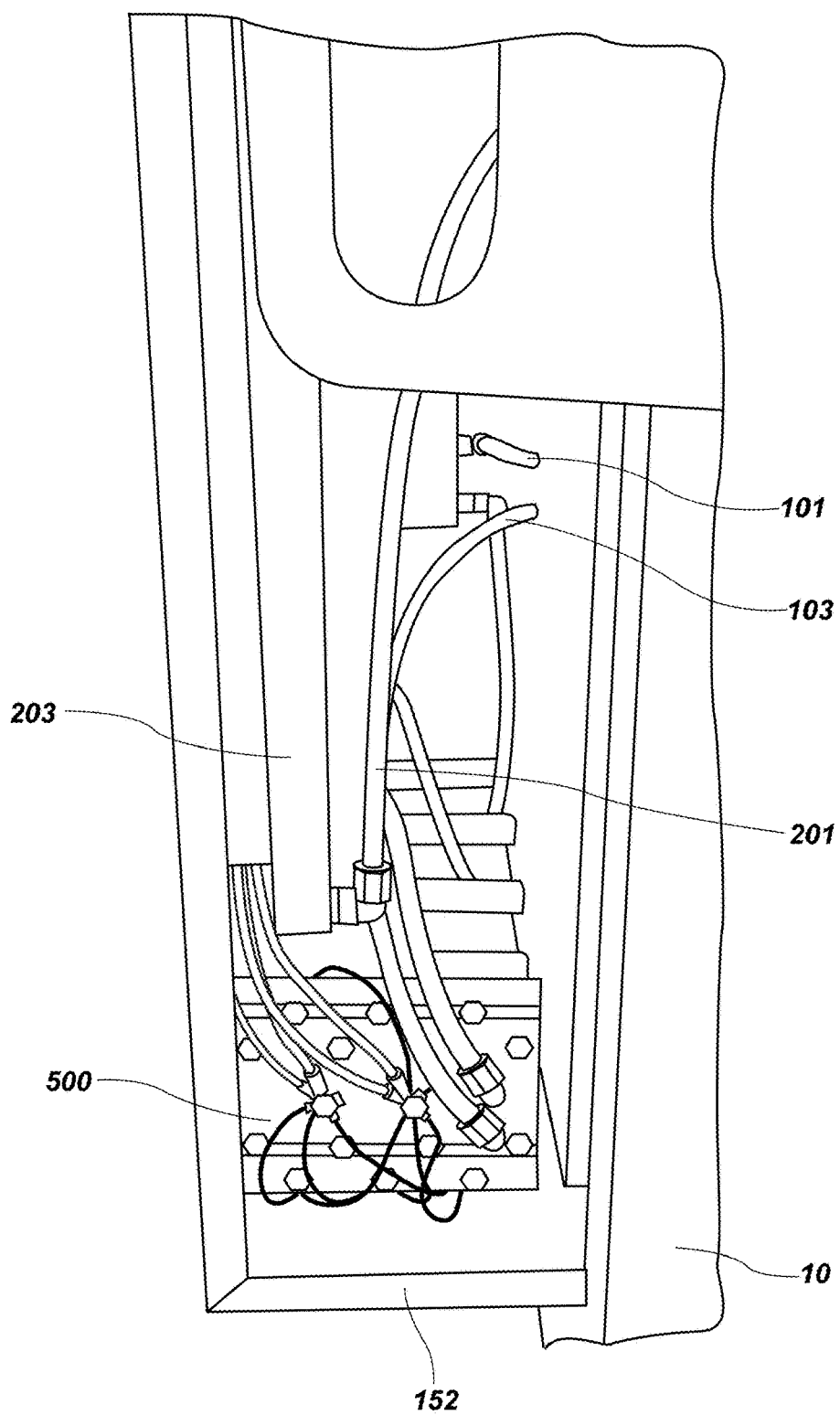
FIG. 4B is a partial side view of the cabinet of FIGS. 1-3 showing the relationship of some of the components of the heating and cooling system.

As depicted in FIGS. 4A and 4B, the second radiator 200, associated fans 202, manifold blocks 500, pumps reservoirs and power blocks may all be disposed on the shroud 152. The second radiator 200 may be disposed in the shroud 152 near the vents 154. One or more fans 202 may be associated with the radiator 200 to create a desired airflow upon activation. As depicted, the radiator 200 and fans 202 may be placed generally in line with the vents 154 to facilitate airflow. It will be appreciated that in some embodiments, the second radiator 200 may comprise one or more separate radiators positioned at different locations, as with one across each row of the depicted vents 154 to facilitate rapid heat transfer.

For use, the fans 102 and 202 may be directly attached to the radiators 100 and 200 by screws, by a suitable thermal epoxy, by attachment using a mounting bracket, or in any other suitable manner. For example, the fans may be attached to a grillwork, which is then strapped to the radiator.

Electric power for the system may be provided by a battery, which may also be contained within the shroud 152. Such a battery powered device is extremely portable and may be used in locations where connection to an electrical outlet is undesirable or impossible. Of course, it will be appreciated that a transformer and line connection may be used to provide connection to any standard electrical outlet for power. Currently, it is preferred to operate the components of the apparatus 10 at a voltage of up to about 15V.

A control panel may be included for the system. In a simple embodiment, the control panel may simply consist of a single switch with three settings, OFF, COOL and HEAT. The switch may be a double-pull double-throw switch. Selection of either closed position, (HEAT or COOL) closes the circuit in an opposite direction, reversing the flow of electricity through the Peltier chips 102 and either cooling or heating at the first radiator 100, to heat or cool the cabinet 10 interior. At the same time the heat or cold generated on the opposite face of the chips 700 is transferred to the second radiator 200 for dispersal from the system.

It will be appreciated that in addition to cabinet 10, system 50 may be used to heat or cool any suitable enclosed space to a desired temperature. For example, other food service containers including coolers, heat boxes, and enclosed spaces in delivery vehicles may be heated or cooled with a system in accordance with the present invention. Additionally, system 50 may be used with containers or structures for uses other than food service. For example, a cabinet for heated or cooled plates at a buffet service, for a cabinet for heating or cooling linens, for a storage container for transporting or storing medical supplies, or for providing a space with a desired temperature for another purpose.

In other embodiments, the control may include multiple switches to individually or jointly control either the operational mode of the Peltier elements, or the functioning of the pump or fans. In other embodiments, variable current controls may be used to adjust the temperature within the cabinet 10 by varying the current through the Peltier elements 700. In other embodiments, a logic control circuit may be used, such a as logic control board on a semiconductor chip. With a logic control circuit, a desired temperature may be selected and the system may cycle on and off as appropriate to maintain the cabinet at or near the selected temperature.

Figure 9A:
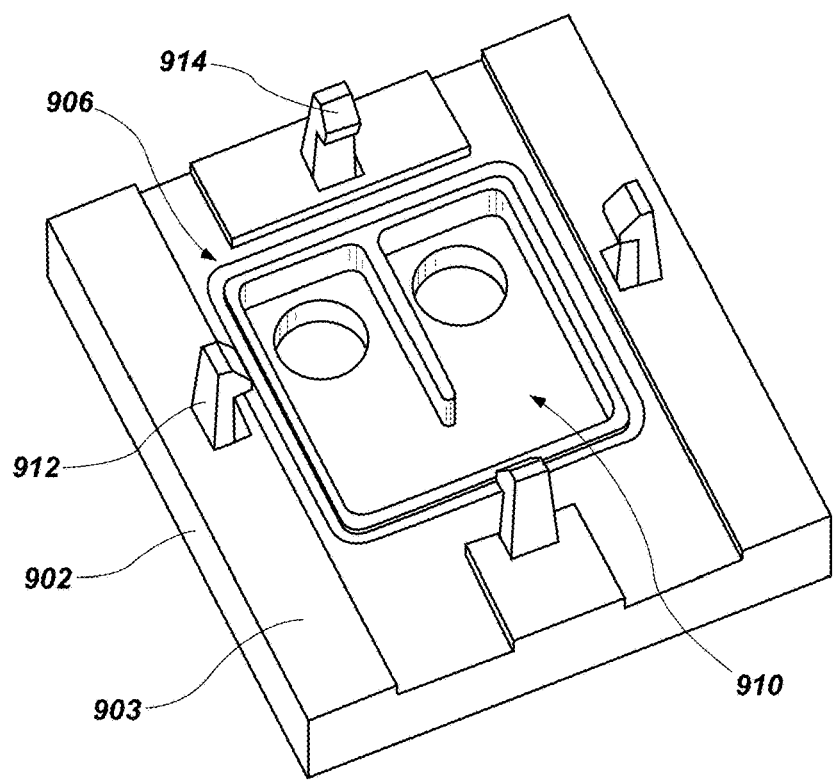
FIGS. 9A and 9B are perspective views of the bottom and top portions of another manifold for use in a system in accordance with the present disclosure.
Figure 9B:
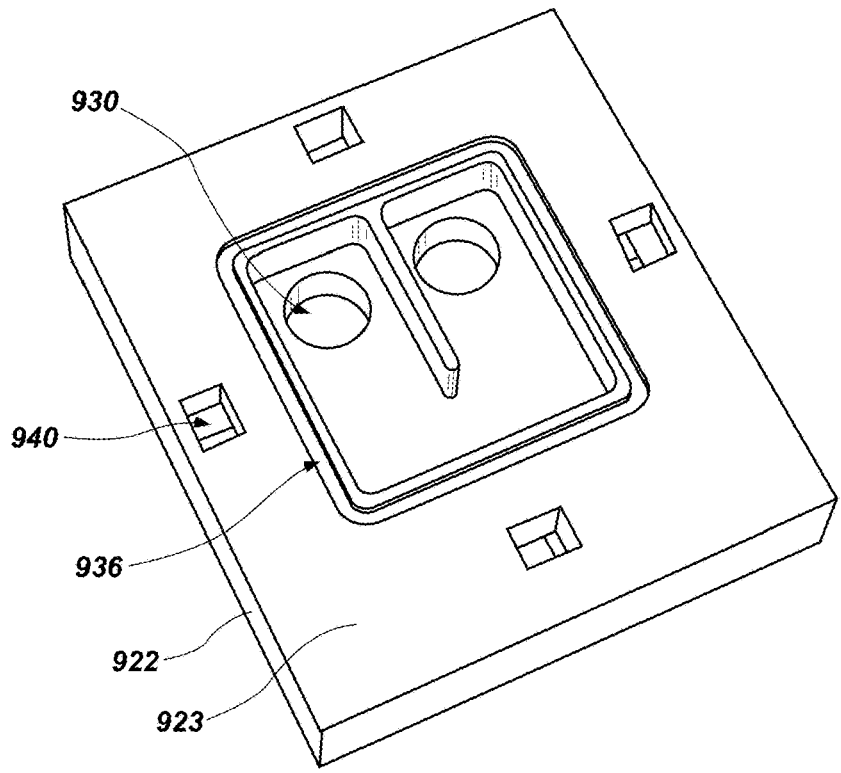
Figure 9C:
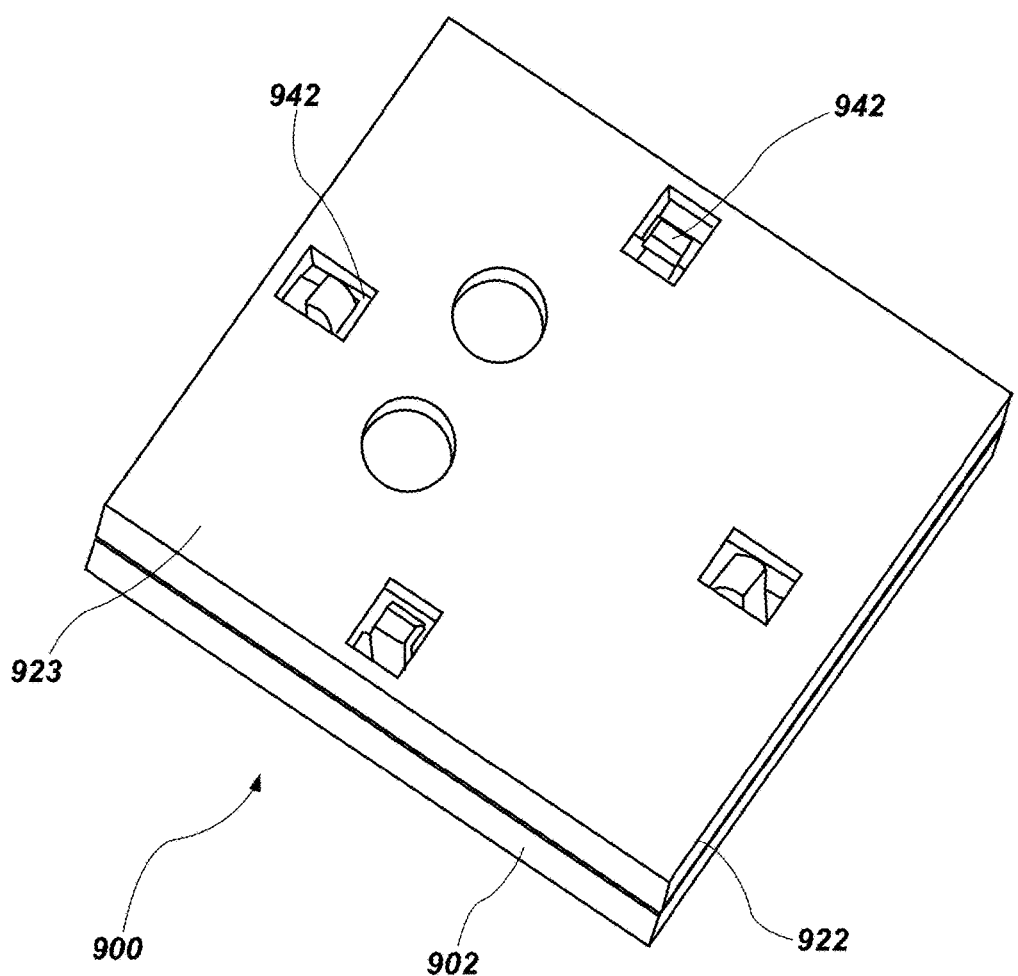
FIG. 9C is a top perspective view of the assembled manifold of FIGS. 9A and 9B.

Turning to FIGS. 9A, 9B and 9C, another embodiment of a manifold block 900 which may be useful in an embodiment of a system in accordance with the present disclosure is depicted. Block 900 may be formed from two manifolds, designated first manifold 902 and second manifold 922, which may be joined face to face with at least one chip 700 sandwiched therebetween, as depicted in FIG. 9C.

The face 903 and 923 of each manifold 902 and 922 are best depicted in FIGS. 9A and 9B and contains at least one recess for receiving a chip 700, each recess contains a flow path 910 or 930, which may be formed as a channel having a Z, S or other shape to direct the flow of a heat transfer liquid from one opening O to another. A recessed notch 906 or 926 is present to hold a seal, such as an O-ring, and may provide a seat for a chip 700. It will be appreciated that in other embodiments, multiple recesses with associated notches may be present.

In use, the seal may be an O-ring that it significantly thicker in height than the recessed depth of notch 906 or 936. This allows the O-ring to function both as a sealing element and as an adjustment element to account for any variations that may occur between various chips 700 due to manufacturing differences. It also allows the O-ring to function as a cushion, protecting the chip 700 from forces that may otherwise damage it during assembly of the block 900 or during operation.

First manifold 902 includes a plurality of connection members 910 formed as extensions rising generally perpendicularly from the face 903 of the block. Each connection member 910 has an enlarged upper portion 912 with a planar undercut 914 disposed thereon parallel to the face 903. The enlarged portion 912 may have a sloped face to facilitate assembly. In the depicted embodiment, there are four connection members 910, one disposed on each side of the recess. However, it will be appreciated that this number may vary as the number of recesses vary and the number of chips 700 that may be placed in the manifold 900 varies. For example, a two-chip embodiment may require a different number of connection members as the arraignment and size may vary. Any number may be used, provided a suitable seal can be achieved.

Second manifold 922 has corresponding connection recesses 940 that are formed therein. Each connection recess 940 includes an opening passing through the body of the manifold 922. As depicted in FIG. 9C, on the rear surface 938 of the manifold 922, each connection recess 940 is formed as a recess that includes a shelf 942. Upon insertion of a connection member 910 though the recess 940, the connection member 910 may slightly flex to allow the enlarged portion 912 to pass through the recess 940, where upon the undercut 914 of the connection member 910 resides above the shelf 942 abuttingly retaining the manifolds 902 and 922 together to form the block 900.

For assembly, O-rings may be placed in notches 906 or 936, the appropriate number of chips 700 placed in position in the recess(es) on either manifold 902 or 922 and the manifolds placed face to face and compressed to be joined by the interaction of the connection structures. Use of cushioning O-rings may protect the chips through this process. It will be appreciated that in addition to the depicted connection structures, other connection structures having differing shapes that can maintain the relationship between the manifolds using an abutting connection or interference fit may be used. Embodiments where each manifold includes some connection recesses and some connection members that correspond to the other recess are also contemplated. Manifolds 902 and 922 may be constructed from an injected molded plastic material capable of absorbing the thermal changes associated with the system.

Experimental Data

Figure 10:
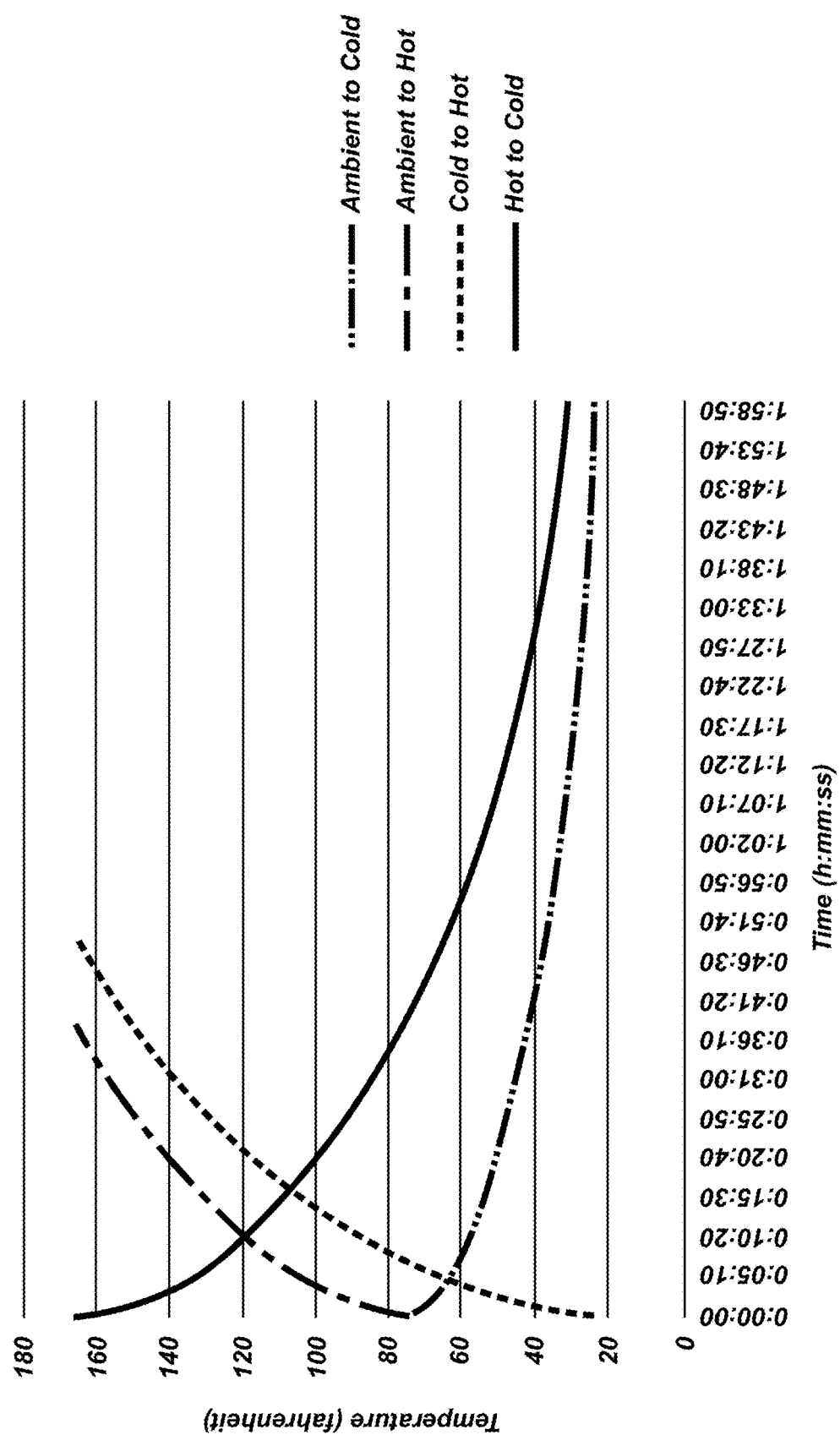
FIG. 10 is a graph depicting results of testing of the cabinet system depicted in FIGS. 1-4B.

A series of tests were run on an embodiment similar to that depicted in FIGS. 1-7. The cabinet 10 was a Cambro CAMTHERM CMBHC1826TTR with an interior volume of about 16 cubic feet (internal dimensions of about 25.5 inches by about 23.75 inches by about 49.5 inches). The system used 24 Laird LHT12-60 Peltier chips which were contained in the manifolds depicted in FIGS. 4A, 5, 6B and 7, which were run at a voltage of about 11.23 DC volts. One internal radiator having dimensions of about 20 inches by about 5 inches by about 1 inch within the cabinet was used and four external radiators having the same dimensions were used in the shroud. The heat transfer fluid was SAFE-T-THERM 40% by Houghton Chemical from the internal radiator to the manifold and water from the manifold to the external radiators which was pumped at a rate of about 4.7 gpm from the manifold to the respective radiators. The cabinet was repeatedly taken from an ambient temperature to a heated condition or a cold condition and from a cold condition to a heated condition, using the system for heating and cooling. Ambient conditions were a temperature of 75 degrees Fahrenheit and the tests were conducted at an altitude of 4436 feet above sea level. A graph of the averaged test results is presented in FIG. 10.

From this test data, the empty cabinet can be heated from ambient temperature to an acceptable temperature for keeping food warm (about 140 degrees F.) in about 15 to 20 minutes. Similarly, the cabinet was taken to an acceptable refrigerator temperature of about 35 degrees F. or less in about an hour and 15 minutes. From the cold condition, the cabinet was able to be taken to a warming condition in less than about 45 minutes. From a heated condition, it could be cooled to an acceptable temperature in less than about 2 hours. The heated and cooled conditions can then be maintained indefinitely. It is noted that this is an improvement over previous cabinets, which merely insulate food, may require another heating or cooling intervention (as by filling with steam trays or ice prior to the placement of food).

While this invention has been described in certain embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A system for bringing a cabinet to a desired temperature and maintaining that desired temperature by heating or cooling the cabinet, comprising:
    a first manifold for heat transfer fluid flow having at least one recess;
    at least one Peltier element disposed at the at least one recess, such that a first heat transfer fluid directly contacts a first surface of the at least one Peltier element by flowing through the at least one recess in the first manifold;
    a first seal contacting the first surface of the at least one Peltier element and the first manifold;
    at least a first fluid-to-air radiator in fluid communication with the first manifold and placed inside the cabinet;
    a second manifold for heat transfer fluid flow having at least one corresponding recess, the second manifold disposed in alignment with the at least one Peltier element, such that a second heat transfer fluid directly contacts a second surface of the at least one Peltier element by flowing through the at least one corresponding recess in the second manifold; and
    at least a second fluid-to-air radiator in fluid communication with the second manifold and placed outside the cabinet;
    wherein application of current in a first direction to the at least one Peltier element generates heat that is transmitted to the at least first fluid-to-air radiator by flow of the first heat transfer fluid to thereby heat an interior of the cabinet, and application of current in a second direction to the at least one Peltier element causes a reduction in temperature that is transmitted to the at least first fluid-to-air radiator to thereby cool the interior of the cabinet as generated heat is transmitted to the at least second fluid-to-air radiator by flow of the second heat transfer fluid for dispersal outside the cabinet.

2. The system of claim 1, wherein the first manifold and second manifold are attached to one another to form a manifold block with the at least one Peltier element disposed therein.

3. The system of claim 2, wherein the first manifold and second manifold are connected to one another by connection structures that retain them together by an interference fit.

4. The system of claim 2, wherein the first manifold comprises a seat around the at least one recess and the first seal contacting the first surface of the at least one Peltier element and the first manifold comprises an O-ring at least partially residing in a groove formed in the seat and having a thickness greater than the groove.

5. The system of claim 2, wherein the at least one Peltier element comprises a plurality of Peltier elements.

6. The system of claim 2, wherein the at least first fluid-to-air radiator comprises a fluid tubing attached to a number of cooling fins.

7. The system of claim 6, further comprising at least one fan disposed to circulate air across the at least first fluid-to-air radiator.

8. The system of claim 6, wherein the at least first fluid-to-air radiator is disposed in a middle portion of the cabinet interior.

9. The system of claim 2, wherein the at least second fluid-to-air radiator comprises a fluid tubing attached to a number of cooling fins.

10. A portable food storage or delivery cabinet for maintaining food at a desired temperature, comprising:
    a cabinet body having an interior and an exterior and at least one opening;
    at least a first door for closing at least one opening;
    at least a first fluid-to-air radiator disposed in the cabinet body interior;
    a first manifold for heat transfer fluid flow in fluid communication with the at least first fluid-to-air radiator, the first manifold disposed outside the cabinet interior and having at least one recess;
    at least one Peltier element disposed at the at least one recess, such that a first heat transfer fluid directly contacts a first surface of the at least one Peltier element by flowing through the at least one recess in the first manifold;
    a first seal contacting the first surface of the at least one Peltier element and the first manifold;
    a second manifold for heat transfer fluid flow having at least one corresponding recess, the second manifold disposed such that a second heat transfer fluid directly contacts a second surface of the at least one Peltier element by flowing through the at least one corresponding recess in the second manifold;
    a second seal contacting the second surface of the at least one Peltier element and the second manifold; and
    at least a second fluid-to-air radiator in fluid communication with the second manifold and placed outside the cabinet.

11. The cabinet of claim 10, wherein the first manifold and second manifold are attached to one another to form a manifold block with the at least one Peltier element disposed therein.

12. The cabinet of claim 11, wherein the at least one Peltier element comprises a plurality of Peltier elements.

13. The cabinet of claim 11, wherein the at least first fluid-to-air radiator comprises a fluid tubing attached to a number of cooling fins.

14. The cabinet of claim 13, further comprising at least one fan disposed to circulate air across the at least first fluid-to-air radiator.

15. The cabinet of claim 10, wherein the at least first fluid-to-air radiator is disposed in a middle portion of the cabinet interior.

16. The cabinet of claim 10, further comprising at least one fan disposed to circulate air across the at least second fluid-to-air radiator.

17. The cabinet of claim 10, wherein application of current in a first direction to the at least one Peltier element generates heat that is transmitted to the at least a first fluid-to-air radiator by flow of the first heat transfer fluid to thereby heat the interior of the cabinet body, and application of current in a second direction to the at least one Peltier element causes a reduction in temperature that is transmitted to the at least first fluid-to-air radiator to thereby cool the interior of the cabinet body as generated heat is transmitted to the at least second fluid-to-air radiator by flow of the second heat transfer fluid for dispersal outside the cabinet.

18. A system for generating a heated or cooled fluid with Peltier elements, comprising:
   a first manifold for heat transfer fluid flow having at least one recess;
   at least one Peltier element in contact with the first manifold, such that a first heat transfer fluid directly contacts a first surface of the at least one Peltier element by flowing through the at least one recess in the first manifold;
   a first seal contacting the first surface of the at least one Peltier element and the first manifold;
   a second manifold for heat transfer fluid flow having at least one corresponding recess, the second manifold in contact with the at least one Peltier element, such that a second heat transfer fluid directly contacts a second surface of the at least one Peltier element by flowing through the at least one corresponding recess in the second manifold; and
   a second seal contacting the second surface of the at least one Peltier element and the second manifold;
   wherein application of current in a first direction to the at least one Peltier element generates heat that is transmitted to the first heat transfer fluid flowing through the first manifold, and application of current in a second direction to the at least one Peltier element causes a reduction in temperature that is transmitted to the first heat transfer fluid flowing through the first manifold as generated heat is transmitted to the second heat transfer fluid flowing through the second manifold for dispersal.

19. The system of claim 18, wherein the first manifold comprises a seat around the at least one recess and the first seal contacting the first surface of the at least one Peltier element and the first manifold comprises a first O-ring residing in the seat.

20. The system of claim 19, wherein the first O-ring at least partially resides in a groove formed in the seat and has a thickness greater than the groove.

* * * * *